Figure 2:
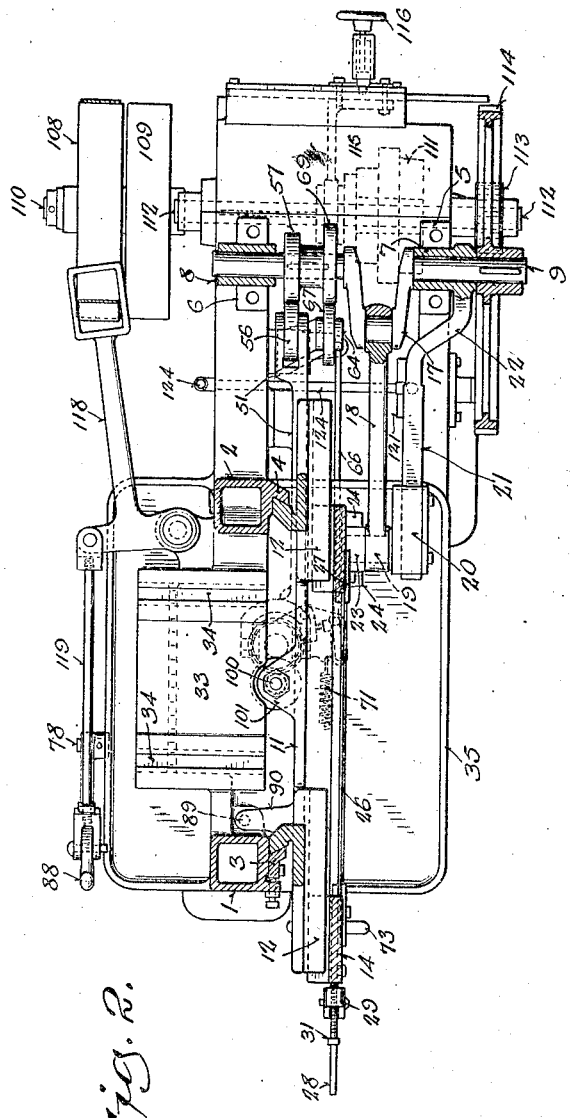

Aug. 31, 1926.

C. RASMUSSEN 1,598,011

METAL SAWING MACHINE

Filed Nov. 1, 1922

4 Sheets-Sheet 1

Fig. 1.

INVENTOR:
Charles Rasmussen,
BY
Bottum Hudnall Lecher & McNamara
ATTORNEYS.

Aug. 31, 1926.

C. RASMUSSEN 1,598,011

METAL SAWING MACHINE

Filed Nov. 1, 1922 4 Sheets-Sheet 2

INVENTOR:
Charles Rasmussen,
BY
Bottum Hudnall Lecher & McNamara
ATTORNEYS.

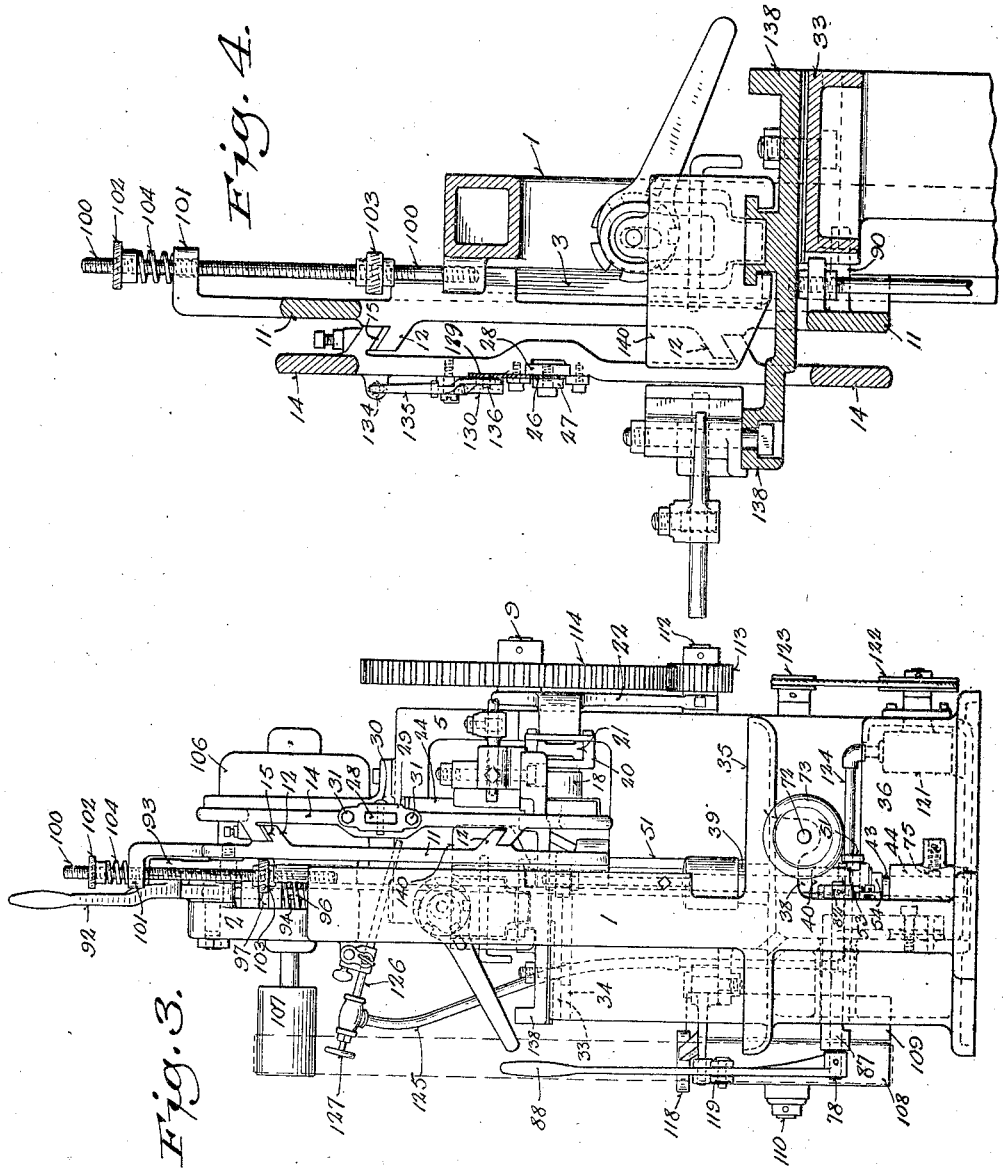

Aug. 31, 1926.
C. RASMUSSEN
1,598,011
METAL SAWING MACHINE
Filed Nov. 1, 1922     4 Sheets-Sheet 4
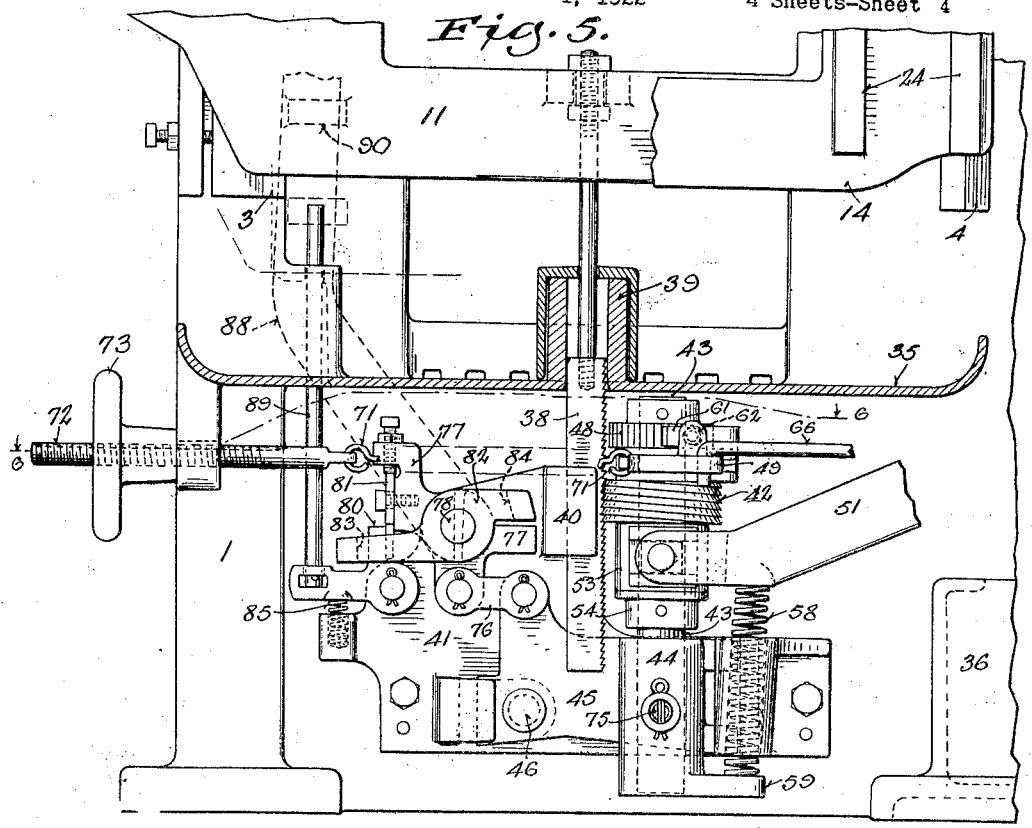
INVENTOR:
Charles Rasmussen,
BY
ATTORNEYS.

Patented Aug. 31, 1926.

1,598,011

UNITED STATES PATENT OFFICE.

CHARLES RASMUSSEN, OF RACINE, WISCONSIN, ASSIGNOR OF ONE-HALF TO RALPH T. INGALLS, OF RACINE, WISCONSIN.

METAL-SAWING MACHINE.

Application filed November 1, 1922. Serial No. 598,295.

This invention relates to metal working machines of the hack saw type.

The main objects of the invention are to adapt metal sawing machines of this type to successfully do with greater rapidity and less waste of material, certain kinds of work such as have heretofore been usually performed with metal planing, shaping, milling and filing machines, in addition to work of the character ordinarily done with hack saws; to support and guide the saw blade with such firmness and rigidity that it will without buckling or deflection readily and truly start and smoothly make cuts in metal bodies of various shapes presenting plane or curved surfaces at more or less acute angles to the plane of the blade; to automatically, yieldingly and adjustably feed the saw to its work; to automatically shift the saw and carry its teeth on the return strokes out of operative engagement with the work; to automatically arrest the feed of the saw upon the completion of its cuts at a predetermined variable point; to facilitate returning the saw to its starting position after making a cut; and generally to improve the construction and operation of metal sawing machines of the type to which this invention pertains.

It consists in the construction, arrangement and combination of parts as hereinafter particularly described and pointed out in the claims.

In the accompanying drawing like characters designate the same parts in the several figures.

Figure 1 is a side elevation of a metal sawing machine embodying the invention; Fig. 2 is a horizontal section on the line 2—2, Fig. 1, and a plan view of the machine; Fig. 3 is an end elevation of the machine as viewed from the left relative to Figs. 1 and 2; Fig. 4 is an enlarged cross section on the line 4—4, Fig. 1; Fig. 5 is an enlarged detail view mainly in side elevation and partly in vertical longitudinal section, of the saw feeding mechanism; and Fig. 6 is an enlarged plan view and horizontal section on the line 6—6, Fig. 5.

Referring more particularly to Figs. 1, 2 and 3, the main or stationary frame of the machine comprises standards or uprights 1 and 2, formed or provided with parallel vertical ways 3 and 4, one of which, as the way 3, is preferably adjustable to take up wear or play; and with sectional standards or posts 5 and 6, provided with bearings 7 and 8, clamped between upper and lower sections of the standards, for a shaft 9.

A vertically movable carriage or frame 11, is mounted and guided on the ways 3 and 4, and is formed or provided transversely to the shaft 9 with parallel horizontal ways 12.

A four-sided horizontally reciprocating saw frame 14, is mounted and guided on the ways 12 and movable vertically with the carriage 11 on the ways 3 and 4. The bearings on one side of the saw frame are preferably provided as shown in Fig. 3, with gibs or adjustable plates 15, to take up wear or play.

The shaft 9 is formed or provided between its bearings 7 and 8, with a crank 17, which is connected by a rod 18 with a wrist pin 19, on a cross head or slide 20. The slide 20 is mounted and guided on a way 21, supported parallel with the ways 12, by a bracket 22, which may be formed with or attached to the bearing 7 and to a stationary part of the machine below, as shown in Figs. 1, 2 and 3.

The wrist pin 19 is provided on the opposite side of the connecting rod 18 from the slide 20, with a block or head 23, which is guided by vertical ways 24 on the adjacent end member of the saw frame 14. By thus connecting the crank 17 with the saw frame, variation in the strokes of the saw or horizontal reciprocating movement of the saw frame in different vertical positions thereof as it moves with the carriage 11, is avoided, and the crank 17 is caused to operate at the most advantageous angles and with uniform effectiveness on the saw frame in different vertical positions thereof as the saw is fed to the work.

A saw blade 26 is connected with the end members of the frame 14 between and parallel with its side members, which are guided and supported on the ways 12, and is thus held rigidly and firmly to its work, so that it will not buckle or be deflected, and is enabled to do certain kinds of work hitherto ordinarily done with planing, shaping, milling and filing machines, and to do such work more expeditiously and with less waste of material. At one end the blade 26 is detachably fastened to the frame 14 by a bolt and clamping plates 27, and at the other end by a clamping plate and a bar 28, which is slidably mounted on the frame and provided with an adjustable straining head 29. The head 29 is adjustably connected with the bar 28 by a bolt or pin 30, passing through one of a series of holes in the bar for blades of different lengths, and is provided with adjusting screws 31, threaded therein above and below and parallel with the bar and engaging the end of the saw frame for stretching the saw blade 26 and holding it taut.

The machine frame is formed or provided between the standards 1 and 2, with a work supporting bed 33, which is formed with transverse undercut grooves 34, for bolting work directly thereto or fastening thereon interchangeable devices with which the machine may be provided, for holding work of various kinds and shapes, one of such devices being shown in Figs. 1 and 3, as mounted on the bed.

Below the bed 33 the frame is formed or provided with a catch basin 35 for oil or cutting liquid with which the saw is supplied during the operation of the machine, and the base of the frame is formed or provided with a reservoir 36, into which the basin drains, as indicated by dotted lines in Fig. 1.

For feeding the saw to its work and shifting it on its return strokes upward out of operative engagement with the work, a vertical rack 38 is connected with the under side of the carriage 11, and extending downwardly through the basin 35 in which it is guided by an upwardly extending bearing 39, is guided below the basin in a bearing 40 on a bracket or plate 41, which is fastened to the frame, as shown in Figs. 1, 5 and 6.

A worm 42 is fixed on the upper end of an upright shaft 43, which is journaled and movable lengthwise adjacent its lower end in a box or bearing 44. The box 44 is formed with or attached to a plate 45, which is pivoted by a pin 46 on the bracket 41, to swing in a vertical plane for shifting the worm 42 into and out of engagement with the rack 38.

A ratchet wheel 48 is fixed on the shaft 43 above the worm 42, and between it and the worm a swinging arm or pawl carrier 49 is loosely mounted on said shaft.

An elbow-shaped lever 51 fulcrumed at 52 on the frame, is forked at its lower end and pivotally connected with a collar 53 loosely confined on the shaft 43 between the worm 42 and a collar 54 fixed on the shaft.

At its upper end the lever 51 is provided with a roller 56 yieldingly held in engagement with a cam 57 on the shaft 9 by a spring 58. The spring 58, which is loosely held in a sleeve on the plate 41, bears at its lower end against a lateral projection 59 on the lower end of the box 44, and tends to swing the worm 42 with its shaft 43 and plate 45 away from the rack 38, as shown in Fig. 1.

The cam 57 is set on the shaft 9 with relation to the crank 17 so that when the worm 42 is in engagement with the rack 38, the saw blade 26 will be lifted on its return or idle strokes out of operative engagement with the work, and upon its working strokes will be returned to and held in operative position.

For intermittently and yieldingly feeding the saw downward to its work, the arm 49 is provided with a pivoted pawl 61, held in yielding engagement with the ratchet wheel by a spring 62.

A lever 64, fulcrumed at 65 to the frame, is connected at its lower end by a rod 66 with the arm 49, and is provided at its upper end with a roller 67 held by a spring 68 in engagement with a cam 69 on the shaft 9.

The cam 69 is set on the shaft 9 with relation to the crank 17, so that it will turn the arm 49 backward during the return strokes of the saw and release it at the beginning of the working strokes thereof.

On the working strokes of the saw the arm 49 is swung forward by a spring 71, which connects it with a screw rod 72, guided in the frame and provided with an adjusting nut 73, for varying the feed pressure on the saw 26, according to the nature of the work.

A slot 74 in the arm 49 with which the rod 66 is engaged, permits the rod to advance with the working strokes of the saw without effect on the pawl 61 and ratchet wheel 48, the downward feed of the saw being effected solely by the spring 71, so that when the saw encounters resistance greater than can be overcome by the spring, its feed movement will be arrested, or the rate of feed will vary according to the resistance of the work and the adjustment of the spring.

The arm 49 is positively retracted to its initial position and the spring 71 is stretched by the cam 69 on the return strokes of the saw. On the working strokes of the saw, the contraction of the spring 71 will turn the ratchet wheel with the arm 49 the full limit permitted by the drop of the cam 69, a distance corresponding with a number of the ratchet wheel teeth, if no or little resistance is encountered by the saw. According to the degree of resistance of the work to the feed movement of the saw and the adjustment of the spring, the ratchet wheel will be turned a variable angular distance of a fraction of a tooth or of one or more teeth.

To prevent angular displacement of the ratchet wheel 48 and worm 42 by the drag of the pawl backward over the ratchet teeth or otherwise the box 44 is provided, as shown in Fig. 3, with a friction shoe or brake 75 pressed by a spring against the shaft 43.

The feed and vertical movements of the saw are controlled by the following mechanism:

An upwardly projecting ear or arm on the pivoted plate 45, is connected by a link 76 with a latch lever 77, which is loosely mounted on a horizontal shaft 78. A latch 80, pivotally mounted on the bracket 41, is adapted by engagement with an adjustable latch block 81 on the lever 77, to support the plate 45 and the box 44 thereon in position as shown in Fig. 5, to hold the worm 42 in engagement with the rack 38. A trip lever 82, fixed on the shaft 78 next to the latch lever 77, is provided at opposite ends with arms 83 and 84 overhanging an arm of the latch 80 and an arm of the latch lever 77, as shown in Fig. 6. The latch 80 is held normally in engagement with the latch lever 77 by a spring 85.

The shaft 78, which has a bearing 87 formed on the bracket or plate 41, as shown in Fig. 6, extends through the frame and is provided at the end opposite the trip lever 82, with a hand lever 88. As shown in Figs. 1, 2 and 5, a stop rod 89 pivoted at its lower end to an arm of the latch 80, extends upwardly therefrom through a guiding bearing on the frame into the path of a lug or projection 90 on the carriage 11.

To lift or help lift the carriage 11 with the saw frame 14 to its starting position after making a cut, an elbow-shaped lever 92, fulcrumed on an upward extension of the standard 2, as shown in Figs. 1 and 3, is connected by a link 93 with the carriage, and by its shorter angular arm, with a rod 94, passing downwardly therefrom through a projection 95 on said standard. A counterbalancing spring 96, through which the rod 94 passes, bears at its upper end against a rocking seat 97, pivoted on the underside of the projection 95, and bears at its lower end against an adjusting nut 98, threaded on the rod, for adjusting the tension of the spring.

The vertical movement of the saw frame 14 with the carriage 11 is adjustably limited by a rod 100, fastened at its lower end in the top of the main or stationary frame of the machine and passing loosely upward through an overhanging ear 101 on the top of the carriage 11. Adjustable stops 102 and 103, threaded on the rod 100 above and below the ear 101, are adapted to cooperate therewith to arrest the upward and downward movement of the carriage at the desired points. A spring 104 surrounding the rod 100 between the ear 101 and the upper stop 102, checks the upward movement of the carriage adjacent its upper limit, and prevents shock or jar.

The crank and cam shaft 9 may be driven by any suitable power connection.

As shown by Figs. 1 and 3 of the drawing, an electric motor 106 is mounted on the standards 5 and 6. A pulley 107 on the armature shaft of the motor, is connected by a belt with a loose pulley 108, or a tight pulley 109, mounted on a horizontal shaft 110 below and parallel with the shaft 9. Power is transmitted from the shaft 110 at a variable speed through suitable change speed gearing 111, to a shaft 112, above and parallel with the shaft 110. The shaft 112 is provided with a pinion 113 which meshes with a gear 114 on the shaft 9. The shifting gears of the change speed gearing which is enclosed in a box or case 115, are adjusted to different positions by a handle 116.

As shown in Figs. 1, 2 and 3, a belt shifter 118, pivotally mounted on the frame, is connected by a rod 119 with the hand lever 88, so that when the hand lever is swung forward or towards the crank shaft 9 to throw the worm 42 into engagement with the rack 38, the belt will be shifted from the loose pulley 108 upon the tight pulley 109, and thereby start the machine.

For supplying oil or cutting liquid to the saw, a pump 121, indicated by dotted lines in Fig. 3, is placed in the reservoir 36, and is driven by a pulley 122, connected by a belt with a pulley 123 on the shaft 110. The pump is connected by a pipe 124, having a flexible section 125 with a nozzle 126, adjustably fastened to the main frame and provided with a controlling and regulating valve 127, for delivering oil or cutting liquid to the work during the operation of the saw.

Referring to Figs. 1 and 4, the saw blade 26 may be still further and more rigidly supported, if desired, for certain kinds of work, by a backing plate or member 129, corresponding in length and thickness with the saw blade and formed at the ends with arms 130, which are adjustably fastened by screws 131 to the end members of the saw frame 14. The plate 129 is adjusted and held with its lower edge firmly against the back of the saw blade, by screws 132, threaded vertically in lugs 133 on the saw frame and engaging the upper sides of the arms 130, and it is stretched and held taut by a screw 134 threaded in a lug on the saw frame and engaging one arm of a lever 135, which is fulcrumed on the saw frame and has a slot in the other arm engaging a pin 136 on the backing plate.

In the operation of the machine, the worm 42 being thrown out of engagement with the rack 38, as shown in Fig. 1, and the carriage 11 with the saw frame 14 being lifted to properly position the saw blade 26 for starting a cut, the work is fastened in place, either directly to the bed 33, or on one of the various holding devices with which the machine may be provided, as for example, a table 138, provided as shown in Figs. 1 and 3, with a fixed jaw 139, a movable jaw 140, and suitable means for adjusting the movable jaw and clamping the work between it and the fixed jaw. The hand lever is thrown to the right from the position in which it is shown in Figs. 1 and 2, thereby carrying the worm into engagement with the rack and shifting the driving belt from the loose pulley 108 upon the tight pulley 109. The shaft 9 being set in motion, imparts a reciprocating movement to the saw frame 14, and with each advance or working stroke of the saw to the right, as shown in Fig. 1, the spring 71 operating through the arm 49, pawl 61 and ratchet wheel 48, yieldingly turns the worm 42 an interval corresponding with one or more teeth or a fraction of a tooth of the ratchet wheel, according to the adjustment of the spring and the resistance of the work to the downward feed movement of the saw. The rotation of the worm 42 in engagement with the rack 38, intermittently feeds the saw with the saw frame 14 and carriage 11, downward.

At the beginning of the working strokes of the saw, the low part of the cam 69 being presented to the roller 67, the lever 64 swings to the right, releasing the spring 71 for feeding the saw downward, the spring 68 holding the roller in contact with the cam, when the feed of the saw is obstructed or retarded.

On the return or idle strokes of the saw to the left, as shown in Fig. 1, the high part of the cam 69 engaging the roller 67, swings the lever 64 in the opposite direction and withdraws the arm 49 with the pawl 32 to its initial position, and strains the spring 71 for imparting the next downward feed movement to the saw.

At the beginning of each return stroke of the saw, the low part of the cam 57 engaging the roller 56, the spring 58 acting through the lever 51, worm 42 and rack 38, lifts the saw frame 14 with the carriage 11, thereby shifting and holding the teeth of the saw blade 26 upward out of operative engagement with the work, till the horizontal movement of the saw frame is reversed, whereupon the high part of said cam engaging said roller, compresses the spring 58 and simultaneously shifts the saw with the saw frame and carriage bodily back to its former position for beginning another working stroke, during which the worm is turned another interval by the spring 71 to feed the saw downward, as hereinbefore explained.

When the saw has completed a cut and the carriage 11 approaches the lower limit of its vertical movement, the lug or projection 90 thereon engaging the upper end of the rod 89, throws the latch 80 out of engagement with the lever 77, which being thus released, permits the spring 58 to shift the worm 42 out of engagement with the rack 38, as shown in Fig. 1. The carriage 11 being thus disconnected from the feeding mechanism, is lifted with the saw frame 8 by the counterbalancing spring 96 acting through the lever 92, to position for starting another cut, such position being determined by the adjustment of the stop 102. By throwing the lever 88 to the right, as seen in Fig. 1, the arm 84 on the trip lever 82, by engagement with the latch lever 77, swings the worm 42 back into engagement with the rack 38, thereby operatively connecting the carriage 11 with the feed mechanism, the latch 80 being thrown by the spring 85 into engagement with the lever 77 and thereby locking the worm in engagement with the rack.

The downward feed movement of the carriage 11 may be automatically arrested at any desired point by the adjustable stop 103, or it may be manually arrested by throwing the lever 88 to the left, as shown in Fig. 1, thereby causing the overhanging arm 83 on the trip lever 82, to disengage the latch 80 from the lever 77, which being thus released, permits the spring 58 to throw the worm 42 out of engagement with the rack 38.

In case the stop 103 is adjusted to arrest the downward movement of the carriage 11 before the lug 90 engages the rod 89, the rod 66 will work idly in the slot 74 of the arm 49, the tension of the spring 71 being insufficient to overcome the resistance of the stop to the downward movement of the carriage.

When the hand lever 88 is swung back to the left, as shown in Fig. 1, for disengaging the feed worm 42 from the rack 38, and thereby disconnecting the carriage and the saw frame from the feed mechanism, the belt shifter 118 is simultaneously actuated to carry the driving belt from the tight pulley 109 upon the loose pulley 108, thereby arresting the movement of the crank and cam shaft 9.

Various modifications in the construction and arrangement of parts of the machine may be made without materially affecting its mode of operation and without departing from the principle and scope of the invention as defined in the following claims.

I claim:—

1. In a metal sawing machine the combination with a stationary frame, of a carriage movably mounted thereon, a reciprocating four-sided saw frame guided on the carriage transversely to its movement on the stationary frame, a saw fastened at its ends to the end members of the saw frame between its side members, and means for reciprocating the saw frame on the carriage.

2. In a metal sawing machine the combination with a stationary frame, of a carriage movably mounted thereon and provided with parallel ways transverse to its movement on the stationary frame, a reciprocating four-sided saw frame supported and guided on said ways, a saw fastened at its ends to the end members of the saw frame between and parallel with said ways, and means for reciprocating the saw frame on the carriage.

3. In a metal sawing machine the combination with a stationary frame provided with parallel vertical ways, of a carriage mounted on said ways and provided with parallel horizontal ways, a four-sided saw frame supported and guided on said horizontal ways, a saw fastened at the ends to the end members of the saw frame between and parallel with the ways on the carriage, means for reciprocating the saw frame on its ways, means for intermittently feeding the saw with the carriage downward, and means for lifting the carriage on the return strokes of the saw.

4. In a metal sawing machine the combination with a stationary frame, of a reciprocating saw frame mounted on the stationary frame, a saw fastened at the ends to the end members of the saw frame, means for stretching the saw, and a backing plate corresponding in length and thickness with the saw and fastened at the ends to the end members of the saw frame independently of the saw and against the back of the latter.

5. In a metal sawing machine the combination with a stationary frame, of a reciprocating saw frame mounted and guided thereon, a saw fastened at the ends to the end members of the saw frame, means for stretching the saw in the saw frame, a backing plate fastened at the ends to the end members of the saw frame, at the back and in the plane of the saw, means for adjusting the backing plate towards the saw to bear firmly against its back, and means for stretching the backing plate and holding it taut in the saw frame.

6. In a metal sawing machine the combination of a stationary frame, a carriage mounted on said frame and provided with a rack, a saw frame guided on the carriage and movable transversely to the movement of the carriage, means for reciprocating the saw frame on the carriage, a feed worm movable into and out of engagement with the rack, and means for shifting the worm into and out of engagement with the rack.

7. In a metal sawing machine the combination of a stationary frame, a carriage mounted on said frame and provided with a rack, a reciprocating saw frame guided and movable on said carriage transversely to the movement of the carriage on the stationary frame, means for reciprocating the saw frame on the carriage, a feed worm movable into and out of engagement with the rack and provided with a ratchet wheel, a reciprocatory member provided with a pawl for turning said ratchet wheel and worm, means for reciprocating said pawl carrying member, and means for shifting the worm into and out of engagement with the rack.

8. In a metal sawing machine the combination with a stationary frame, of a carriage guided on said frame and provided with a rack, a reciprocating saw frame guided on the carriage transversely to its movement on the stationary frame and provided with a saw, means cooperating with the rack for feeding the saw with the saw frame and carriage towards the work, means for actuating said feeding means, a lever connected with said feeding means and acting through the latter to shift the carriage with the saw frame away from the work on the return strokes of the saw, and means for reciprocating the saw frame.

9. In a metal sawing machine the combination with a stationary frame, of a carriage guided on said frame and provided with a rack, a reciprocating saw frame guided on said carriage transversely to its movement on the stationary frame and provided with a saw, a movably mounted bearing, a worm rotatably mounted in said bearing and movable therewith into and out of engagement with said rack, means for turning said worm to feed the saw with the saw frame and carriage towards the work, means for reciprocating the saw frame on the carriage, and means for shifting the movable bearing to carry the worm into and out of engagement with the rack.

10. In a metal sawing machine the combination with a stationary frame, of a carriage guided on said frame and provided with a rack, a reciprocating saw frame guided and movable on the carriage transversely to its movement on the stationary frame, means for reciprocating the saw frame on the carriage, a worm adapted to cooperate with the rack, means comprising a cam for rotating the worm to feed the saw with the carriage towards the work, and means for operatively connecting and disconnecting the worm and rack.

11. In a metal sawing machine the combination with a stationary frame, of a carriage guided on said frame and provided with a rack, a reciprocating saw frame guided on the carriage transversely to its movement on the stationary frame and provided with a saw, means for reciprocating the saw frame on the carriage, a rotatable and axially shiftable worm adapted to cooperate with the rack, means for turning the worm to feed the saw with the carriage to the work, a lever connected with the worm, and a cam cooperating with the lever to intermittently shift the worm axially to move the carriage with the saw away from the work.

12. In a metal sawing machine the combination with a stationary frame, of a carriage guided on said frame and provided with a rack, a reciprocating saw frame guided on the carriage transversely to its movement on the stationary frame and provided with a saw, means for reciprocating the saw frame on the carriage, a worm adapted to cooperate with the rack to feed the saw with the carriage to the work, means for rotating the worm, and means for manually disconnecting the worm and rack.

13. In a metal sawing machine the combination with a stationary frame, of a vertically movable carriage guided on said frame, a horizontally reciprocating saw frame, mounted on the carriage and provided with a saw, means for reciprocating the saw frame on the carriage, means for feeding the saw with the carriage to the work, means for lifting the saw from the work on the return strokes of the saw, a counterbalancing lever connected by one of its arms with said carriage, and a spring connection with the other arm of said lever tending to lift the carriage and parts carried thereby.

14. In a metal sawing machine the combination with a stationary frame, of a vertically movable carriage mounted on the stationary frame, a horizontally reciprocating saw frame guided on and movable with the carriage, means for reciprocating the saw frame, means for feeding the carriage with the saw frame downward, means for automatically disconnecting the carriage from the feeding means at a predetermined point in the downward movement of the carriage, and counterbalancing means connected with the carriage and tending to lift it.

15. In a metal sawing machine the combination with a stationary frame, of a vertically movable carriage guided thereon, a reciprocating saw frame guided on the carriage transversely to its movement on the stationary frame, means for reciprocating the saw frame, means for feeding the carriage with the saw frame downward comprising a worm and rack movable one into and out of engagement with the other, means for turning the worm, means tending to disengage the worm and rack, means for releasably holding the worm and rack in engagement, and means for automatically tripping the holding means to disengage the worm and rack at a predetermined point in the downward movement of the carriage and saw frame.

16. In a metal sawing machine the combination with a stationary frame, of a vertically movable carriage guided thereon, means tending to move the carriage upwardly, a reciprocating saw frame guided on the carriage transversely to its movement on the stationary frame, means for reciprocating the saw frame, means for feeding the carriage with the saw frame downward comprising a worm and rack movable one into and out of engagement with the other, means for turning the worm, means tending to disengage the worm and rack, means for releasably holding the worm and rack in engagement, and means for automatically tripping the holding means to disengage the worm and rack at a predetermined point in the downward movement of the carriage and saw frame.

17. In a metal sawing machine the combination with a stationary frame, of a carriage guided thereon and provided with a rack, a saw frame guided on the carriage transversely to its movement on the stationary frame and provided with a saw, means for reciprocating the saw frame on the carriage, a worm mounted on the stationary frame and movable into and out of engagement with the rack, means for rotating the worm to feed the saw with the saw frame and carriage to the work, means tending to shift the worm out of engagement with the rack, means for releasably holding the worm in engagement with the rack, means for automatically tripping the holding means to release the carriage at a predetermined point in its downward movement, and manually operated means for shifting the worm into and out of engagement with the rack.

18. In a metal sawing machine the combination with a stationary frame, of a carriage guided thereon and provided with a rack, means tending to move the carriage upwardly, a saw frame guided on the carriage transversely to its movement on the stationary frame and provided with a saw, means for reciprocating the saw frame on the carriage, a worm mounted on the stationary frame and movable into and out of engagement with the rack, means for rotating the worm to feed the saw with the saw frame and carriage to the work, means tending to shift the worm out of engagement with the rack, means for releasably holding the worm in engagement with the rack, means for automatically tripping the holding means to release the carriage at a predetermined point in its downward movement, and manually operated means for shifting the worm into and out of engagement with the rack.

19. In a metal sawing machine the combination with a stationary frame, of a vertically movable carriage guided thereon and provided with a rack, means tending to move the carriage upwardly, a horizontally reciprocating saw frame guided on the carriage and provided with a saw, a bearing movably mounted on the stationary frame, an axially shiftable worm journaled in said bearing and movable into and out of engagement with the rack, means for turning the worm to feed the saw downward, means for lifting the worm on the return strokes of the saw, means tending to shift the worm with its bearing out of engagement with the rack, means for releasably locking the worm in engagement with the rack, means for automatically tripping the holding means to disengage the worm and release the carriage at a predetermined point in the downward movement of the carriage, and means for manually shifting the worm into and out of engagement with the rack.

20. In a metal sawing machine, the combination with a stationary frame, of a reciprocatory saw frame mounted and movable transversely to its reciprocatory movement on said frame, a wrist pin guided parallel with the reciprocatory movement of the saw frame on a stationary part of the machine and guided on the saw frame transversely to its reciprocatory movement, and a crank connected by a rod with the wrist pin.

21. In a metal sawing machine, the combination with a stationary frame provided with vertical ways and a horizontal guide, a vertically movable carriage mounted on said ways and provided with horizontal ways, a horizontally reciprocating saw frame mounted on said horizontal ways and provided with a vertical guide, a wrist pin slidably connected with said horizontal guide on the stationary frame and with the vertical guide on the saw frame, a rotary driving crank, and a rod connecting the crank with the wrist pin.

22. In a hack saw of the class described, a plurality of superimposed four-sided frames, two of said frames being supported by the third and being slidable relatively to each other and to said third frame, and a saw blade extending across one of said movable frames and attached at its ends to opposite sides thereof.

23. In a hack saw of the class described, a stationary supporting structure, a four-sided carriage frame slidably mounted thereon, a four-sided saw frame slidably mounted on said carriage frame for movement at right angles to the path of travel of the latter, and a saw blade extending across said saw frame and attached at its ends to opposite sides thereof.

In witness whereof I hereto affix my signature.

CHARLES RASMUSSEN.